United States Patent [19]

Kanamori et al.

[11] Patent Number: 5,117,497
[45] Date of Patent: May 26, 1992

[54] SYSTEM FOR SYNTHESIZING PLURALITY OF SOURCE PROGRAMS BY COMBINING SYNTAX ELEMENTS AND CONDITIONS OF THE PROGRAMS

[75] Inventors: Yoshimasa Kanamori, Kanazawa; Kazuhiko Imaizumi, Yokohama, both of Japan

[73] Assignee: Hitachi, Ltd., Tokyo, Japan

[21] Appl. No.: 225,822

[22] Filed: Jul. 29, 1988

[30] Foreign Application Priority Data

Sep. 18, 1987 [JP]  Japan .................. 62-234529

[51] Int. Cl.⁵ ...................... G06F 9/06; G06F 9/44
[52] U.S. Cl. .................. 395/700; 364/259; 364/260.4; 364/267.91; 364/280.7; 364/281.7; 364/973; 364/DIG. 2
[58] Field of Search ... 364/200 MS File, 900 MS File

[56] References Cited

U.S. PATENT DOCUMENTS

| | | | |
|---|---|---|---|
| 4,330,822 | 5/1982 | Dodson | 364/200 |
| 4,556,954 | 12/1985 | Advani et al. | 364/900 |
| 4,558,413 | 12/1985 | Schmidt et al. | 364/300 |
| 4,706,212 | 11/1987 | Toma | 364/900 |
| 4,782,444 | 11/1988 | Munshi et al. | 364/300 |

FOREIGN PATENT DOCUMENTS

| | | | |
|---|---|---|---|
| 61-202224 | 9/1986 | Japan | 364/900 |
| 61-234434 | 10/1986 | Japan | 364/900 |

*Primary Examiner*—Thomas C. Lee
*Assistant Examiner*—Ayni Mohamed
*Attorney, Agent, or Firm*—Antonelli, Terry, Stout & Kraus

[57] ABSTRACT

In order to add a program synthesis function in a unit of a syntax element of a source program to a structured editor having a syntax, there is disposed a synthesis condition list keeping a source program specify portion and priority information between source programs. In a synthesize section combining syntax parse trees, a search operation is carried out for the respective syntax elements based on the priority information supplied for each frame, slot, or method of the source program, thereby synthesizing a new syntax parse tree.

3 Claims, 10 Drawing Sheets

SOURCE PROGRAM A AS SYNTHESIS RESULT

FIG. 4

LIST OF SYNTHESIS CONDITION OF
SOURCE PROGRAMS A AND B

| SYNTHESIS ITEM | | | SYNTHESIS CONDITION |
|---|---|---|---|
| SYNTHESIS OBJECTIVE SOURCE PROGRAM | | | INCORPORATE SOURCE PROGRAM A INTO SOURCE PROGRAM B |
| PRIORITY INDICATION OF SYNTHESIS SYNTAX ELEMENT | slot | | ASSIGN HIGHER PRIORITY TO SOURCE PROGRAM B |
| | method | | ASSIGN HIGHER PRIORITY TO SOURCE PROGRAM A |

SYNTAX PARSE TREE OF SOURCE PROGRAM B

SYSTEM FOR SYNTHESIZING PLURALITY OF SOURCE PROGRAMS BY COMBINING SYNTAX ELEMENTS AND CONDITIONS OF THE PROGRAMS

BACKGROUND OF THE INVENTION

The present invention relates to a method of combining programs, namely, to a method of editing source programs in a structure editor having therein a syntax or a syntax rule of an objective language of the source programs, and in particular, to a source program combining method suitable for combining a plurality of source programs to synthesize a new source program.

Conventionally, as editing methods or input methods of a source program in a structured editor having a syntax rule, there have been known program editing or program input methods described in the JP-A-61-234434 and JP-A-61-202224.

According to these methods, when a particular source program is to be edited, an operator can edit the source program without considering the details of the syntax rule, which facilitates the editing of the source program.

However, in the prior art technology above, a single source program is set as an object of the editing, namely, consideration have not been given to the editing of a plurality of source programs and hence it is impossible to mechanically combine a necessary portion of a source program including the syntactically identical content with another program so as to obtain or to synthesize a new source program, which leads to a problem that the pertinent necessary portion is required to be inputted by the operator and hence an onerous operation is required for the editing.

SUMMARY OF THE INVENTION

It is therefore an object of the present invention to provide a program combine or synthesize method in which from a source program other than a source program as an edited object, a syntactically identical syntax element is automatically extracted so as to be automatically combined with the source program as the edited object for synthesizing a new source program, thereby solving the problems of the prior art technology.

The object above can be solved by a program combine or synthesize method according to the present invention in a structured editor having therein a syntax in which a source program as an edited object undergoes a syntax analysis conforming to the syntax of an objective language so as to keep a result of the syntax analysis in a form of a syntax parse tree and editing of each source program is effected corresponding to the syntax parse tree, there is disposed apparatus specifying a synthesize or combine condition of a plurality of source programs each described in conformity with a syntax to be sequentially combined for a synthesis of a new source program and the source program is synthesized by combining syntax elements respectively of the plural source programs, the syntax elements each having the same syntactical meaning, according to the syntax incorporated therein and the combine condition specified via said specify apparatus.

In the program synthesize method according to the present invention, in response to an instruction from the operator, control of a program is passed to either the structured editor or a controller or a control unit disposed to input a synthesize or combine condition.

When the operator inputs a combine or synthesis condition of a plurality of source programs from the control unit inputting a combine condition, based on the identifications, priority levels of the programs contained in the inputted instruction, nodes of the syntax parse tree of the source program being edited in the structured editor and those of the other source programs specified via the control unit are extracted, thereby synthesizing a syntax parse tree according to the specified synthesize condition.

As a result, syntax elements of a plurality of source programs having the same syntactial meaning can be automatically combined by a syntax editor apparatus.

BRIEF DESCRIPTION OF THE DRAWINGS

The present invention will be apparent from the following detailed description taken in conjunction with accompanying drawings in which.

DESCRIPTION OF THE PREFERRED EMBODIMENTS

Referring now to the drawings, description will be given in detail of embodiments according to the present invention.

Figure 2:
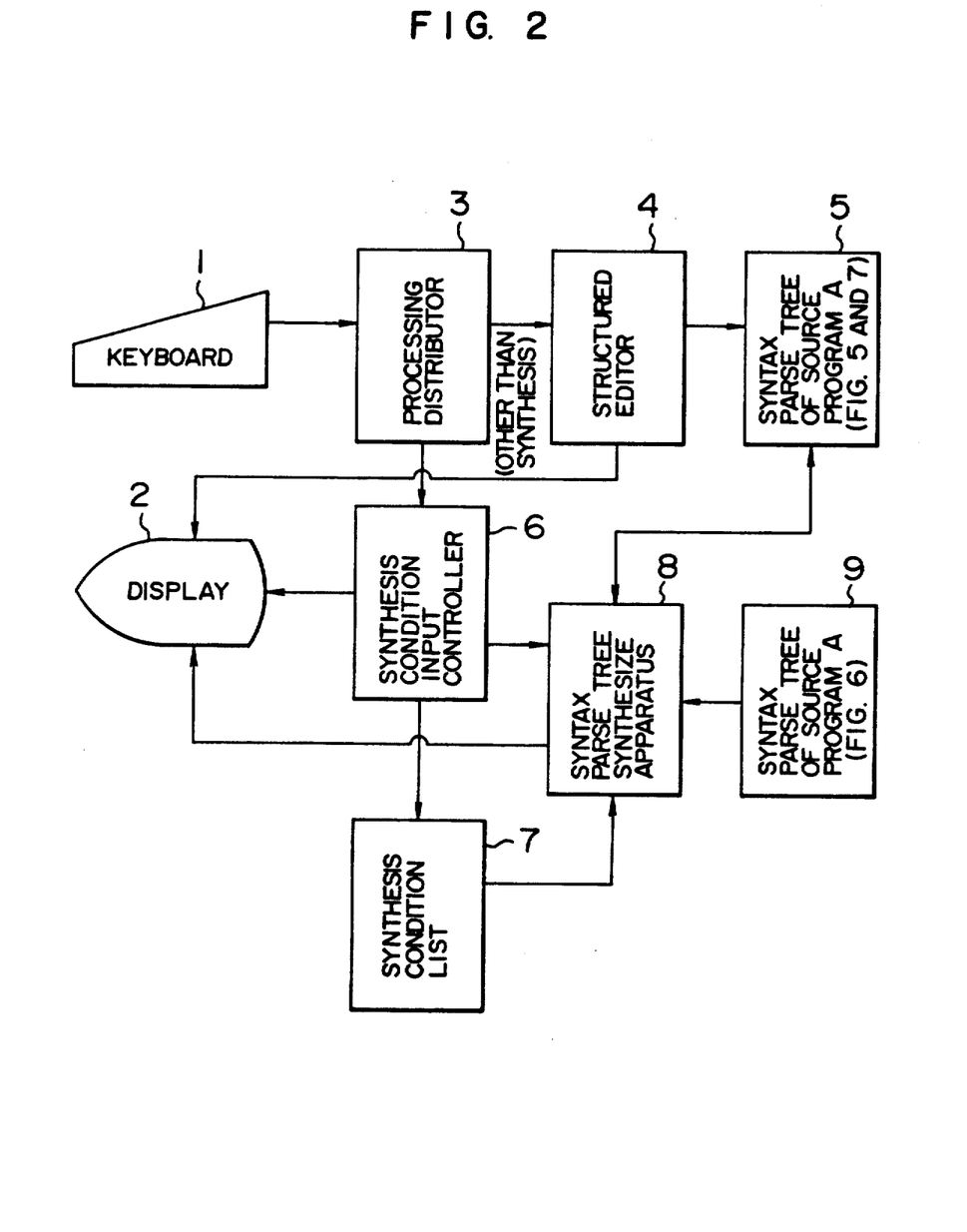
FIG. 2 is a schematic diagram showing the configuration of the apparatus of the embodiment.

FIG. 2 shows the configuration of an apparatus as an embodiment according to the present invention. This system includes a keyboard 1 to receive specifications of a source program name as an object of the editing, an editing operation, and a synthesis condition, and a program text, a display 2 to display a source program, a list of the synthesis condition, and a result of the synthesis, a processing distributor 3 to control a structured editor 4 and a synthesis condition input controller 6, which will be described later, and to transfer input information to the structured editor 4 and the synthesis condition input controller 6, a structured editor 4 which edits a source program in conformity with the syntax of the program so as to generate a syntax parse tree, and a syntax parse tree 5 generated from the source program A in the structured editor 4.

In addition, the synthesis condition input controller 6 generates a synthesis condition list 7, which will be described later, in response to an instruction of a synthesis condition received via the processing distributor 3, displays the synthesis condition list 7 on the display 2, and controls a synthesis parse synthesis unit 8, which will be described later. The synthesis condition list 7 keeps the synthesis condition specified by the operator. The system further includes a syntax parse synthesize unit 8 which combines, based on the syntax parse tree 5 of the source program A and the syntax parse tree 9 of the source program B, the respective syntax parse nodes of the source programs A and B as the objects of the synthesis as indicated in the synthesis condition list 7, and a syntax parse tree of the source program B already generated in the structured editor 4.

Figure 3A:
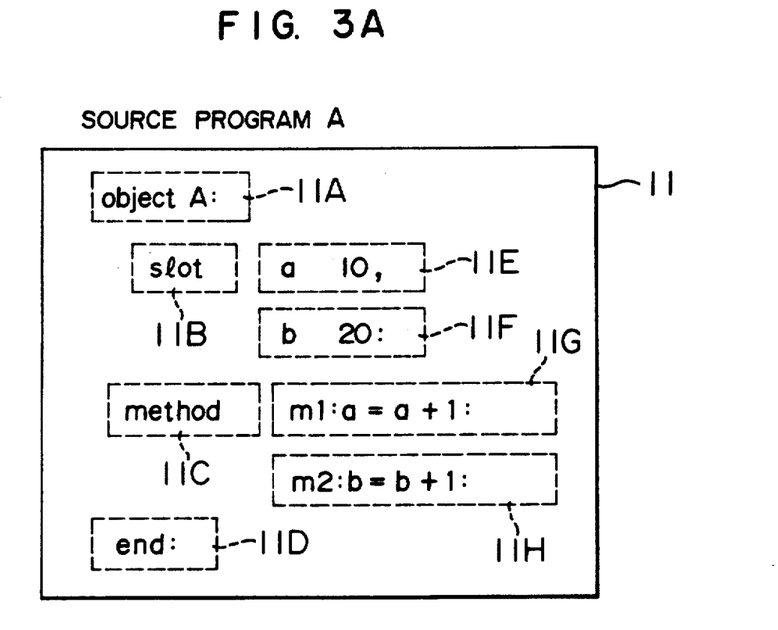
FIGS. 3A to 3C are schematic diagrams showing an example of source programs subjected to a program synthesis and a result of the synthesis.
Figure 3B:
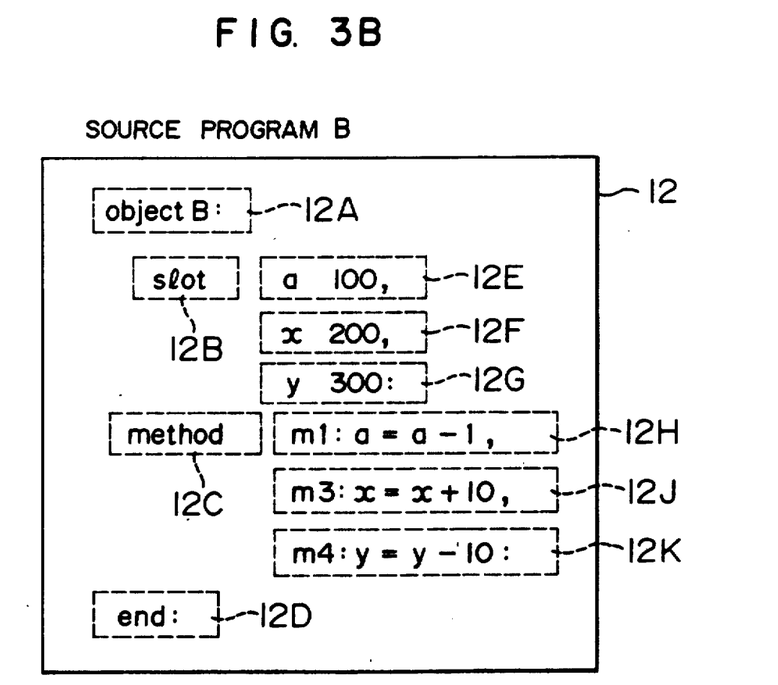
Figure 3C:
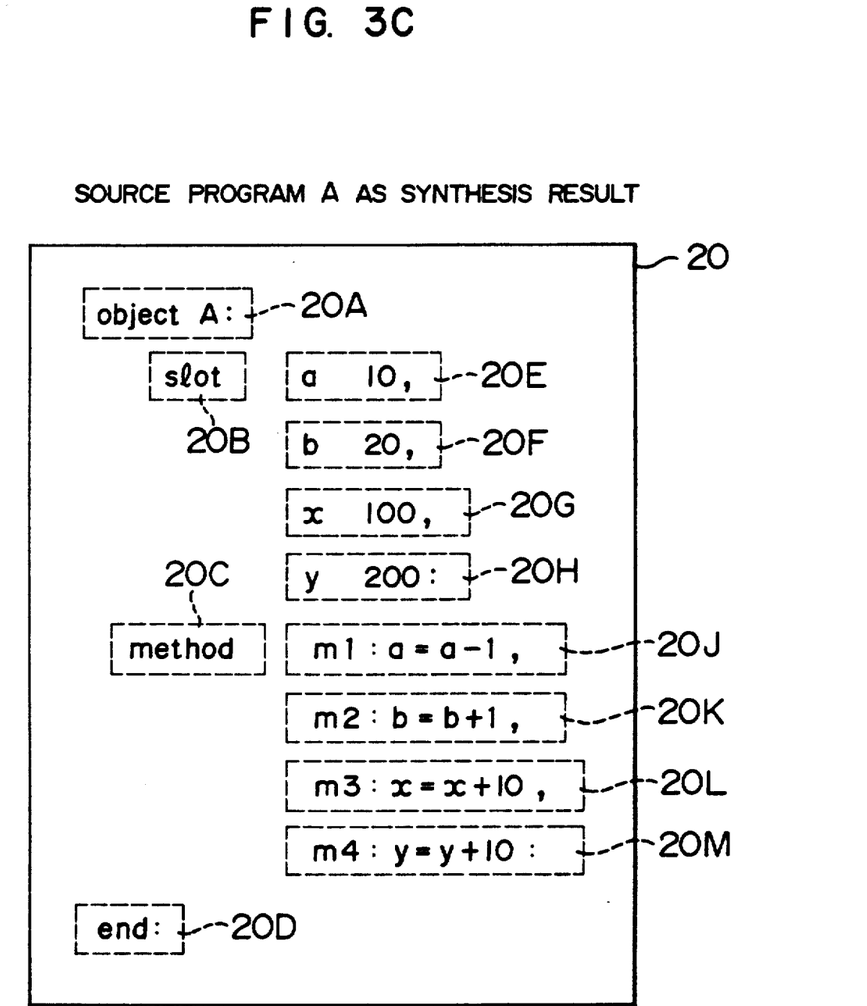
Figure 4:
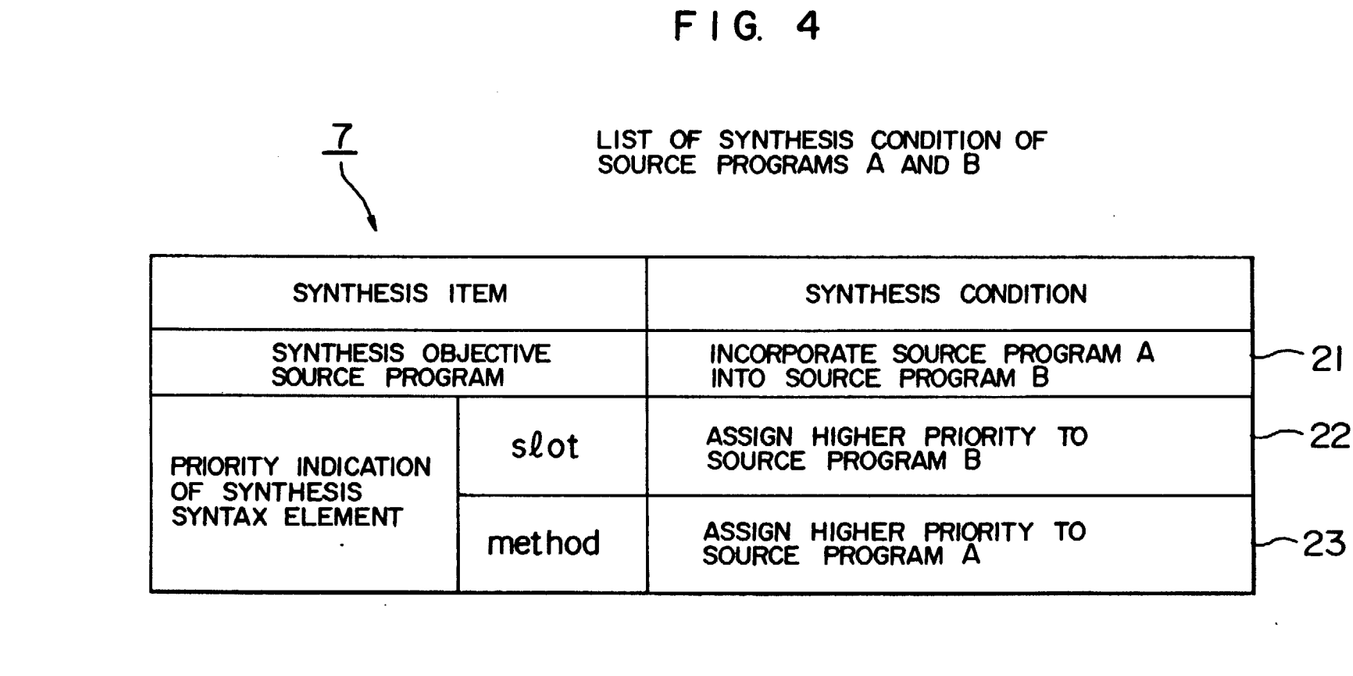
FIG. 4 is a schematic diagram showing a synthesis or combine condition for combining source programs A and B.

FIGS. 3A to 3C are diagrams showing an embodiment according to the present invention in which a source program A1 including frames or objects A for the syntax analysis is combined with a source program B12 including frames or objects B for the syntax analysis depending on the synthesis or combine conditions for the source programs A and B listed in FIG. 4 so as to synthesize a source program A20 as a result of the synthesis.

FIG. 4 shows the synthesis condition list 7 for the source programs A and B in which a synthesis condition 21 indicates that the source program A is to be incorporated into the source program B. Synthesis conditions 22 and 23 specify source programs including syntax elements having a higher priority in a case where there exist duplicated syntax elements as syntax units to be subjected to the synthesis. The synthesis condition 22 means that in a case where the source programs A and B contain duplicated syntax elements for a slot as a syntax unit representing data of the object, for example, an entry, the synthesis is to be effected with the syntax element of the source program A assigned with the higher priority. The synthesis condition 23 designates that in a case where the source programs A and B contain duplicated syntax elements for a method as a syntax unit representing a specific processing content for the object, the synthesis is to be effected with the syntax element of the source program B assigned with the higher priority.

Under the synthesis condition of FIG. 4, the syntax element 20E of the source program A20 as the synthesis result of FIG. 3C becomes identical to the syntax element 11E of FIG. 3A by use of the synthesis condition of 22 of FIG. 4, whereas the syntax element 20J becomes equal to the syntax element 12H through the synthesis with the synthesis condition 23 of FIG. 4.

Figure 1:
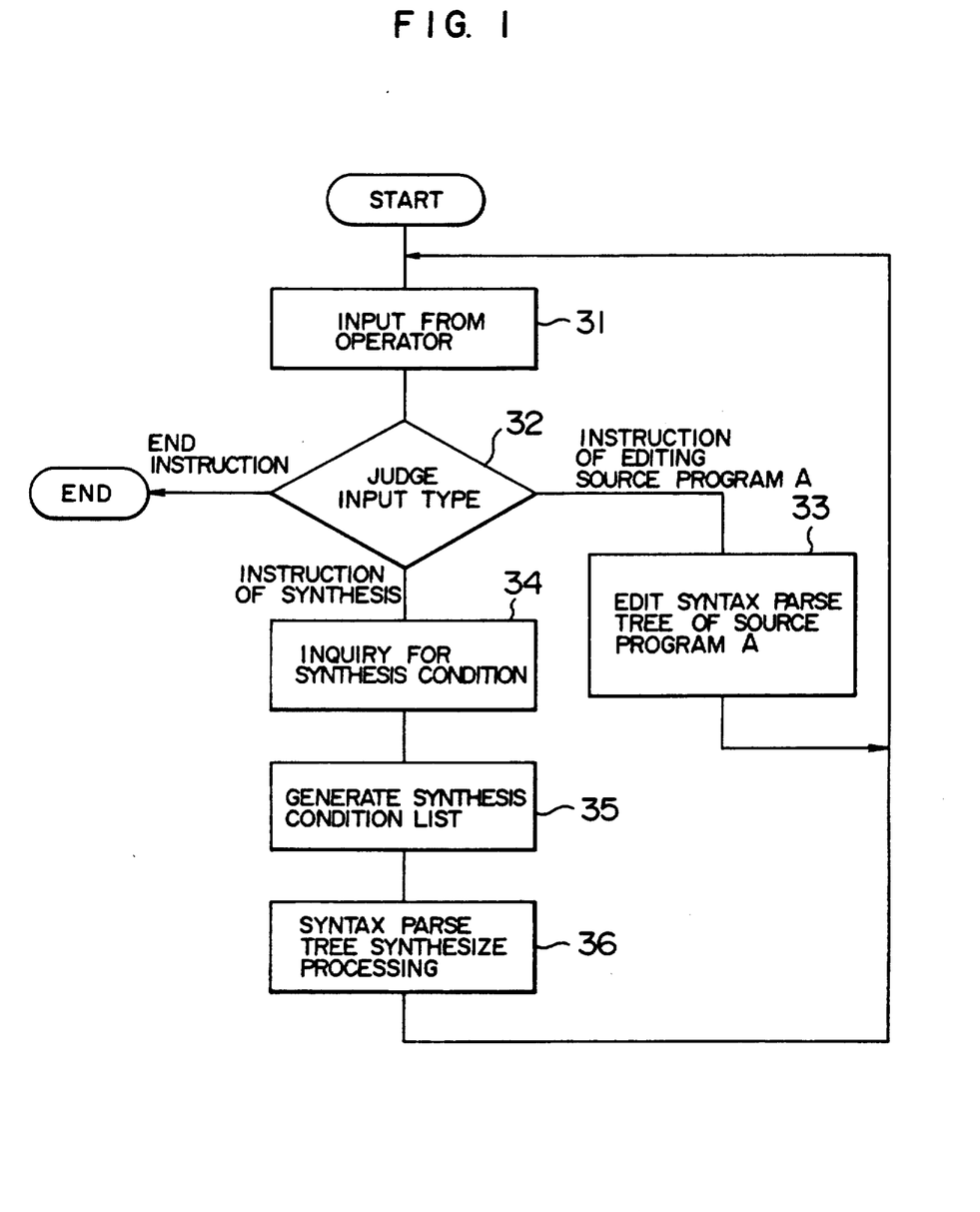
FIG. 1 is a flowchart showing an outline of the operation effected by an apparatus as an embodiment according to the present invention.

FIG. 1 shows a flowchart outlining the operation of the apparatus of FIG. 2.

First, in step 31, the processing distributor 3 receives an input supplied from the keyboard 1 by the operator, and then in step 32, the input type is judged. If the input type is an end instruction, the processing is terminated. In step 33, the structured editor 4 effects an editing of a syntax parse tree of the source program A and then passes control to the step 31.

If the input type is a synthesis instruction for the source programs A and B, step 34 is effected such that the synthesis condition input controller 6 issues an inquiry to the operator for a synthesis condition. In step 35, the synthesis condition list 7 associated with the content of FIG. 4 is generated by use of a result of the inquiry.

Figure 5:
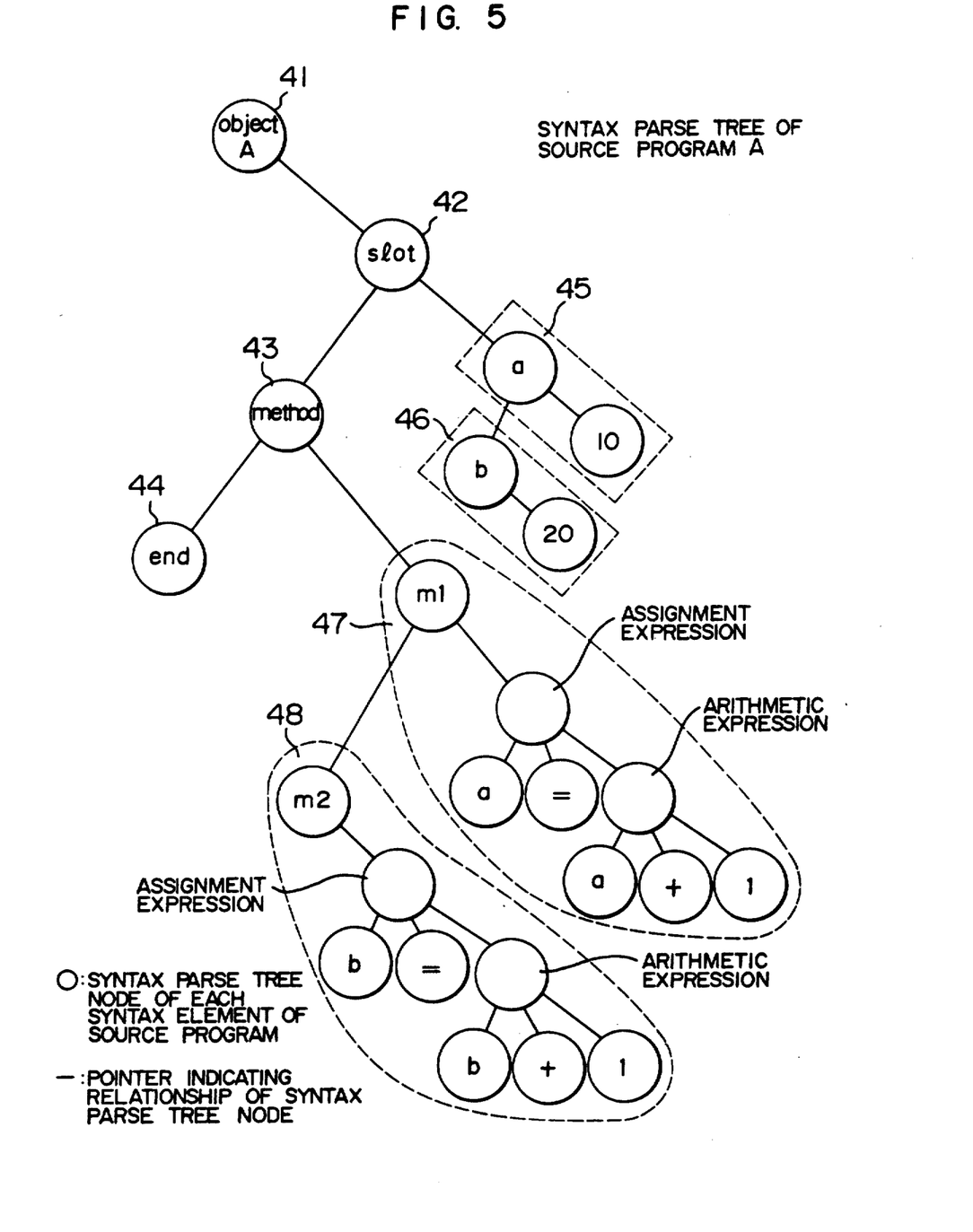
FIGS. 5 and 6 are diagrams schematically showing an example of syntax parse trees of source programs as an object of the synthesis.
Figure 6:
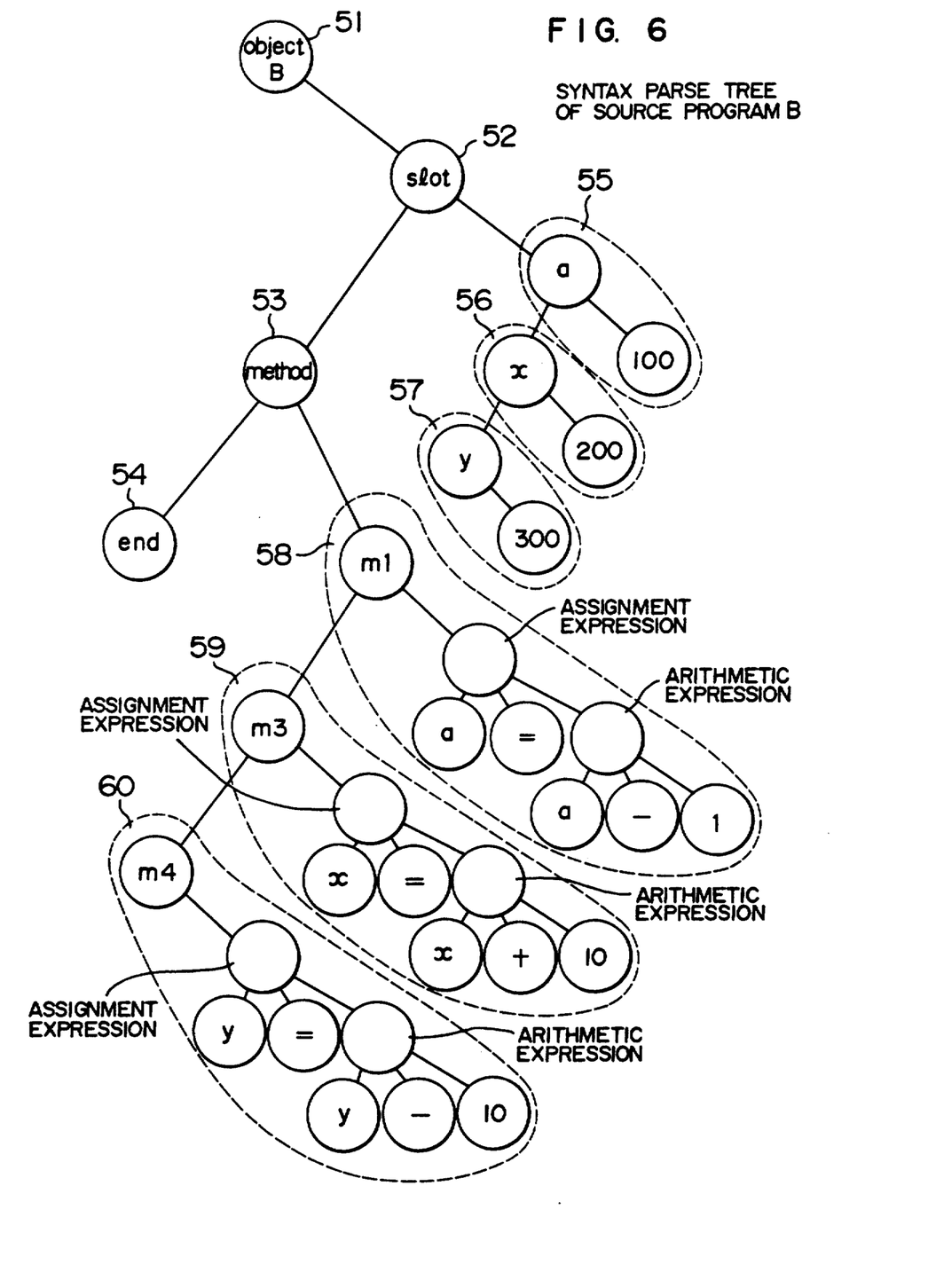
Figure 7:
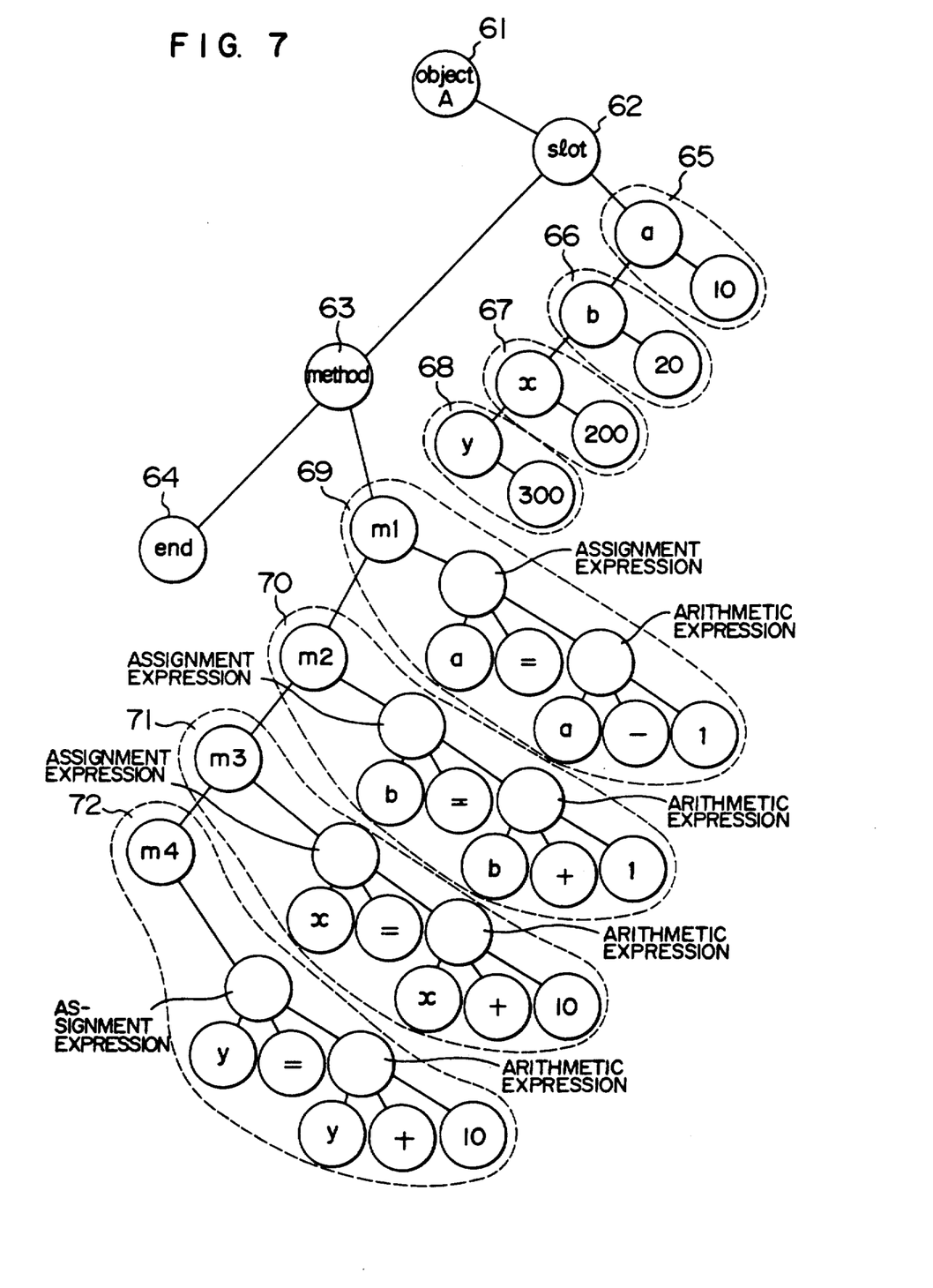
FIG. 7 is a diagram showing an example of a syntax parse tree of a synthesized result.

In step 36, the syntax parse tree synthesize unit 8 combines the syntax parse tree 9 of the source program B having the content of FIG. 6 with the syntax parse tree 5 of the source program A having the content of FIG. 5 by use of the combine condition list 7 so as to synthesize the syntax parse tree 5 of the source program A having the content of FIG. 7; thereafter, control is transferred to the step 31.

In FIG. 5, there is shown a syntax parse tree of the source program A11 in which a syntax parse tree node 41 corresponds to the syntax element 11A of the source program A11. Similarly, there exist correspondences between a node 42 and the syntax element 11B, a node 43 and the syntax element 11C, a node 44 and the syntax element 11D, a node 45 and the syntax element 11E, a node 46 and the syntax element 11F, a node 47 and the syntax element 11G, and a node 48 and the syntax element 11H, respectively.

FIG. 6 is a syntax parse tree of the source program B12 in which a syntax parse tree node 51 corresponds to the syntax element 12A of the source program B12. Similarly, there exist correspondences between a node 52 and the syntax element 12B, a node 53 and the syntax element 12C, a node 54 and the syntax element 12D, a node 55 and the syntax element 12E, a node 56 and the syntax element 12F, a node 57 and the syntax element 12G, a node 58 and the syntax element 12H, a node 59 and the syntax element 12J, and a node 60 and the syntax element 12K, respectively.

FIG. 7 is a syntax parse tree of the source program A20 obtained as a synthesis result through a synthesis achieved in the step 36 of FIG. 1 by the syntax parse synthesize apparatus of FIG. 2 depending the synthesis condition list 7 in which a syntax parse tree node 61 corresponds to the syntax element 20A of the source program A20. Similarly, there exist correspondences between a node 62 and the syntax element 20B, a node 63 and the syntax element 20C, a node 64 and the syntax element 20D, a node 65 and the syntax element 20E, a node 66 and the syntax element 20F, a node 67 and the syntax element 20G, a node 68 and the syntax element 20H, a node 69 and the syntax element 20J, a node 70 and the syntax element 20K, a node 71 and the syntax element 20L, and a node 72 and the syntax element 20M, respectively.

Here, for the syntax parse node 61, the syntax parse node 11A is employed under the synthesis condition 21; in the similar fashion, the node 42 is employed for the node 62, the node 43 for the node 63, the node 44 for the node 64, the node 46 for the node 66, the node 56 for the node 67, the node 57 for the node 68, the node 48 for the node 70, the node 59 for the node 71, and the node 60 for the node 72, respectively. In addition, under the synthesis condition 22, the syntax element 45 is used for the syntax element 65; whereas, the syntax parse tree node 58 is employed for the syntax parse tree node 69 by use of the synthesis condition 23.

According the method above, the syntax parse tree of FIG. 5 for the source program A11 is combined with the syntax parse tree of FIG. 6 for the source program B12 so as to synthesize as a result of the combine operation the syntax parse tree of FIG. 7 for the source program A20.

Figure 8A:
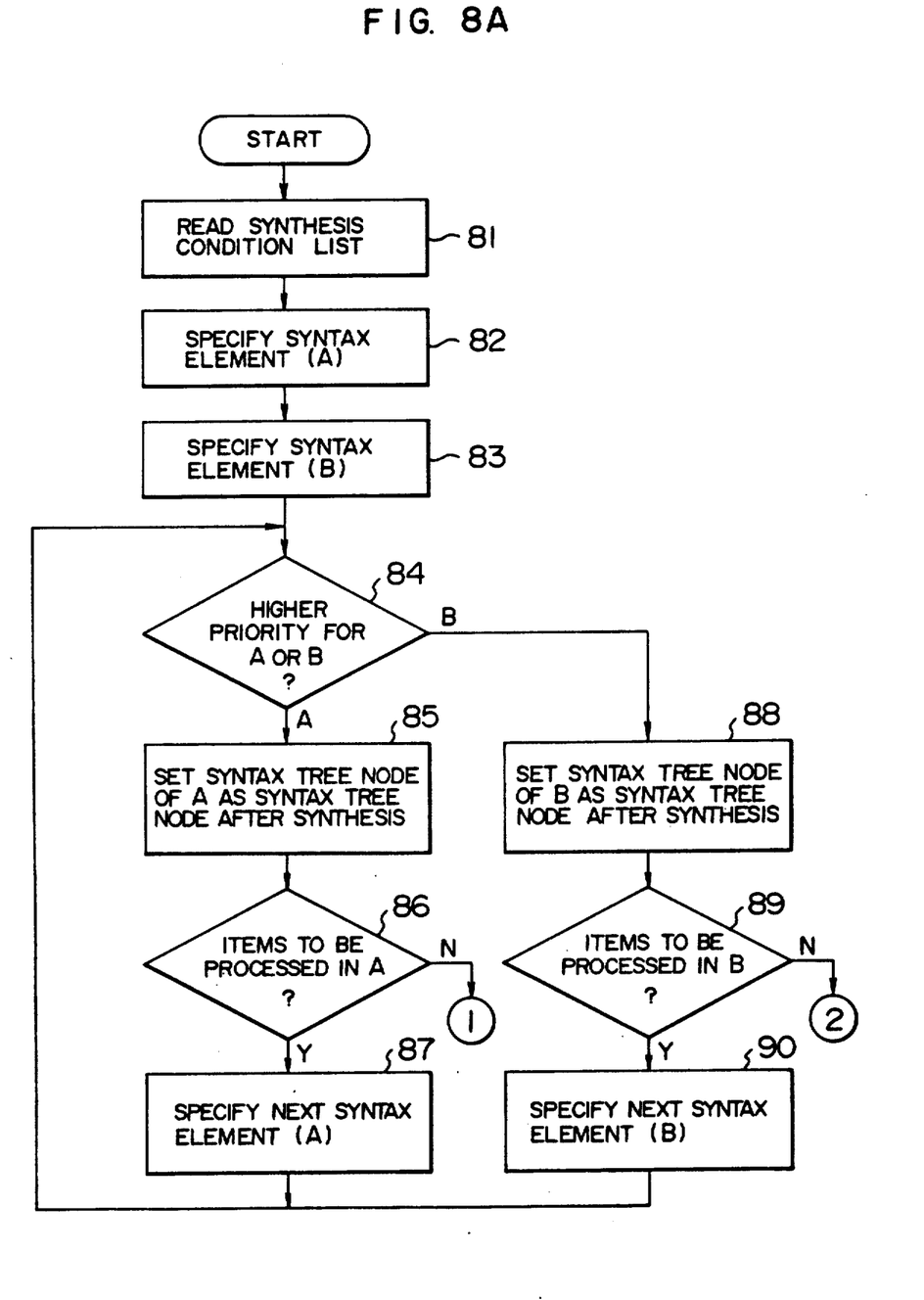
FIGS. 8A and 8B are flowcharts showing a procedure of the program synthesis in a syntax parse tree synthesize apparatus of FIG. 2.
Figure 8B:
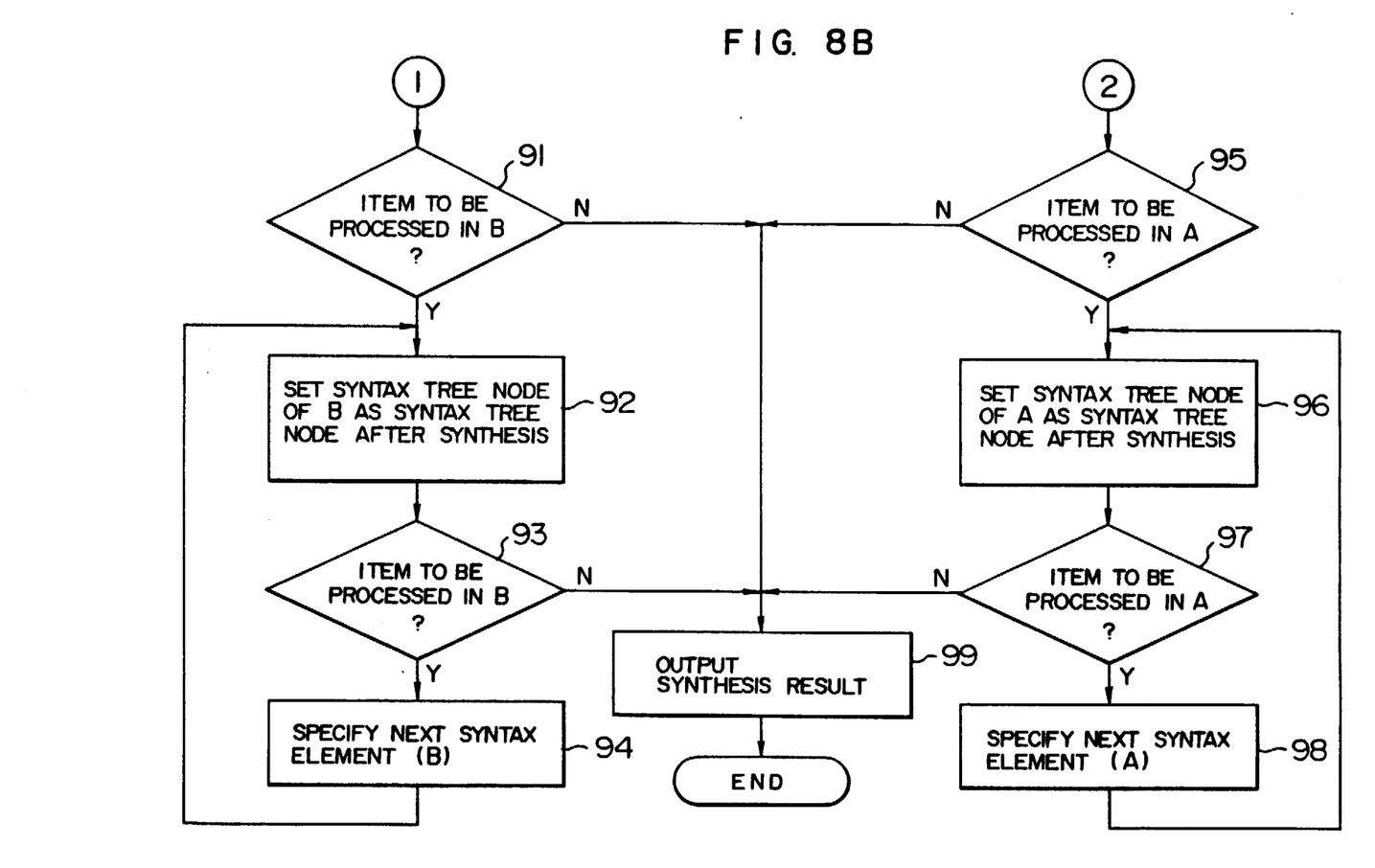

FIGS. 8A and 8B are flowcharts showing a synthesis procedure (the step 36 of FIG. 1) in the syntax parse tree synthesize apparatus 8 of FIG. 8.

In step 81, the synthesis condition list 7 of FIG. 2 is read, and in step 82, the syntax parse tree 5 of the source program A is read so as to specify the first syntax element as the source program A. In step 83, the syntax parse tree 9 of the source program B is read so as to identify the first syntax element as the source program B. In step 81, according to the priority indications of synthesis elements read in the step 81 and kept in the synthesis condition list 7, it is judged which one of the syntax elements of the source programs A and B is to be assigned with the higher priority. If the syntax element of the source program A has the higher priority, the processing proceeds to step 85.

In the step 85, one of the syntax elements as the objects of the present processing for the source program A is set as a syntax parse tree node after the synthesis. In step 86, it is judged whether or not there remains still another syntax element of the syntax parse tree of the source program A to be processed. If this is the case, control is passed to step 87. In the step 87, the next syntax element to be processed in the syntax parse tree of the source program A is determined, and then control is transferred to the step 84.

In the step 84, if the syntax element of the source program B has the higher priority, the processing proceeds to step 88. In the step 88, one of the syntax elements as the objects of the present processing for the source program B is set as a syntax parse tree node after the synthesis. In step 89, it is judged whether or not there remains still another syntax element of the syntax parse tree of the source program B to be processed. If this is the case, control is passed to step 90. In the step 90, the next syntax element to be processed in the syntax parse tree of the source program B is determined, and then control is transferred to the step 84.

In the step 86, if there does not exist any syntax element to be processed in the syntax parse tree of the source program A, the processing proceeds to step 91 (FIG. 8B). In the step 91, it is judged whether or not there remains still another syntax element of the syntax parse tree of the source program B to be processed. If this is the case, control is passed to step 92. In the step 92, one of the syntax elements as the objects of the present processing for the source program B is set as a syntax tree node after the synthesis. In step 93, it is judged whether or not there remains still another syntax element of the syntax parse tree of the source program B to be processed. If this is the case, control is passed to step 94. In the step 94, the syntax element to be processed in the syntax parse tree of the source program B is identified and then control is passed to the step 92.

In the step 89, if there does not exist any syntax element to be processed in the syntax parse tree of the source program B, the processing proceeds to step 95. In the step 95, it is judged whether or not there remains still another syntax element of the syntax parse tree of the source program A to be processed. If this is the case, control is passed to step 96. In the step 96, one of the syntax elements as the objects of the present processing for the source program A is set as a syntax tree node after the synthesis. In step 97, it is judged whether or not there remains still another syntax element of the syntax parse tree of the source program A to be processed. If this is the case, control is passed to step 98. In the step 98, the syntax element to be processed in the syntax parse tree of the source program A is determined and then control is passed to the step 96.

In the step 91, if there does not exist any syntax element to be processed in the syntax parse tree of the source program B, the processing proceeds to step 99. In the step 93, if there does not exist any syntax element to be processed in the syntax parse tree of the source program B, control is passed to step 99. In the step 95, if there does not exist any syntax element to be processed in the syntax parse tree of the source program A, the processing proceeds to step 99. In the step 97, if there does not exist any syntax element to be processed in the syntax parse tree of the source program A, control is passed to step 99. In the step 99, the syntax parse tree synthesized through the processing above is outputted as the syntax parse tree 5 of the source program A of FIG. 2.

According to the embodiment above, in a case where a plurality of source programs are combined for a synthesis of a new source program, the operator need only instruct the synthesis condition so as to easily combine the objective source programs, thereby synthesizing a new source program in conformity with the syntax.

It is to be appreciated that the embodiment is described only as an example and does not restrict the present invention.

In a program combine or synthesize method according to the present invention in a structured editor having therein a syntax in which a source program as an edited object undergoes a syntax analysis conforming to the syntax of an objective language so as to keep a result of the syntax analysis in a form of a syntax parse tree and editing of each source program is effected corresponding to the syntax parse tree, there is disposed means specifying a synthesize or combine condition of a plurality of source programs each described in conformity with a syntax to be sequentially combined for a synthesis of a new source program and the source program is synthesized by combining syntax elements respectively of the plural source programs, said syntax elements each having the same syntactical meaning, according to the syntax incorporated therein and the combine condition specified via said specify means. In consequence, there can be implemented a program synthesis method in which syntactically identical syntax elements are automatically extracted from a source program other than one set as the object of the editing so as to be automatically incorporated into the source program as the editing object.

According to an alternative embodiment, a merge operation is possible in which a slot or a method is deleted from a program B which is not duplicated with a program A having the higher priority. In this case, in the judgement of the step 86 of FIG. 8A, in a case of NO, in place of a jump via a connector ① to the program of FIG. 8B, if a jump to the step 99 is effected such that the synthesis result is outputted and then the execution of the program is terminated, the portion not duplicated in the program B can be deleted. The specification of the deletion is implemented by assigning a delete flag to a program not having the higher priority of the slot or method in the list of FIG. 4.

According to another embodiment, it is possible to specify three or more programs as the synthesis objective source programs in the synthesis condition list and to assign priority levels to the respective programs for each slot and for each method. The list can be generated in consideration with the format of the list of FIG. 4.

We claim:

1. A program synthesize method of synthesizing source programs by combining a plurality of programs in a structured editor effecting a syntactical analysis on source programs in conformity with a syntax so as to generate syntax parse trees, comprising the steps, being performed on a computer, of:

specifying a synthesis condition on at least two programs;

synthesizing a source program by combining said at least two programs wherein syntax elements are selected from said at least two programs based on said synthesis condition; and executing, after a synthesizing step is completed on syntax elements of one of said at least two programs assigned with a higher priority level based on said synthesis condition, a step for synthesizing remaining syntax elements of the other one of said at least two programs.

2. A program synthesize method of synthesizing source programs by combining a plurality of programs in a structured editor effecting asyntactical analysis on source programs in conformity with a syntax so as to generate syntax parse trees, comprising the steps, being performed on a computer, of:

specifying a synthesis condition on at least two programs;

synthesizing a source program by combining said at least two programs wherein syntax elements are selected from said at least two programs based on said synthesis condition; and outputting, after a step for synthesizing is completed for syntax elements of one of said at least two programs assigned with a higher priority level based on said synthesis condition, a synthesis result so as to complete a program synthesis from a plurality of programs.

3. A program synthesize method of synthesizing source programs by combining a plurality of programs in a structured editor effecting a syntactical analysis on source programs in conformity with a syntax so as to generate syntax parse trees, comprising the steps, being performed on a computer, of:

specifying a synthesis condition on at least two programs; and synthesizing a source program by combining said at least two programs wherein syntax elements are selected from said at least two programs based on said synthesis condition;

wherein said synthesis condition includes priority level information corresponding to said syntax elements selected from said at least two programs.

* * * * *